(No Model.)
W. R. MARSH.
HAND PIECE FOR DENTAL ENGINES.
No. 427,780. Patented May 13, 1890.
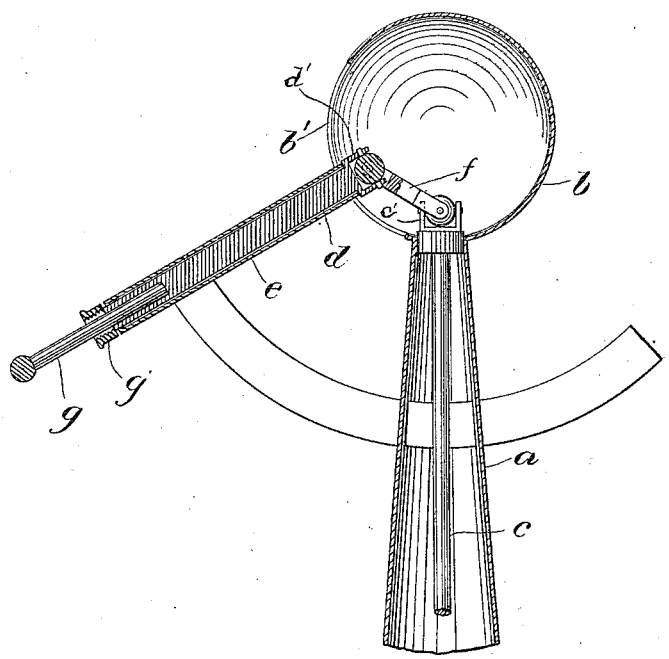
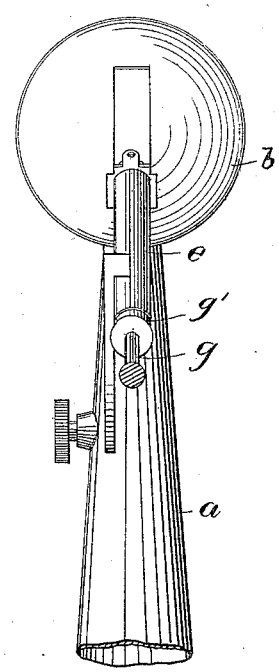
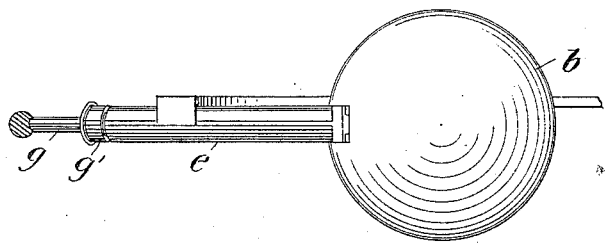
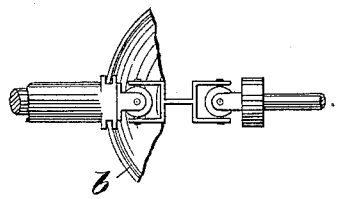
Witnesses.
Fred. L. Greenleaf
Frederick L. Emery
Inventor.
William R. Marsh,
by Crosby & Gregory Attys

UNITED STATES PATENT OFFICE.

WILLIAM R. MARSH, OF BOSTON, MASSACHUSETTS.

HAND-PIECE FOR DENTAL ENGINES.

SPECIFICATION forming part of Letters Patent No. 427,780, dated May 13, 1890.

Application filed June 13, 1889. Serial No. 314,114. (No model.)

*To all whom it may concern:*

Be it known that I, WILLIAM R. MARSH, of Boston, county of Suffolk, State of Massachusetts, have invented an Improvement in Hand-Pieces for Dental Engines, of which the following description, in connection with the accompanying drawings, is a specification, like letters on the drawings representing like parts.

Hand-pieces for dental engines have heretofore been made consisting of a tool-holder to receive the drill or other tool, and a shell or case to which the tool-holder is jointed by a universal joint.

This invention has for its object to construct a hand-piece for dental engines having a tool-holder which may be turned to an acute angle with relation to the shell or case, which is cheap to manufacture, and is efficient and durable.

My invention therefore consists in the combination, with a shell or case to be grasped by the hand and a rotatable shaft contained in it having bearings at one end, of a tool-holder and a shaft contained in it having bearings and a double gimbal-joint arranged in the bearings of the shafts.

Figure 1 shows in vertical section a jointed hand-piece or drill; Fig. 2, a side view of the device shown in Fig. 1; Fig. 3, a top view of the device shown in Fig. 1, and Fig. 4 a detail to be referred to.

The outside case $a$, to be grasped by the hand, has, as herein shown, attached to it a hollow spherical head $b$, slitted at one side, as at $b'$. A shaft $c$ has its bearings in the case $a$ and has at its end bearings $c'$. The tool-holder $e$ contains a shaft $d$, having bearings $d'$. A double gimbal-joint $f$ connects the shafts $c$ and $d$, being arranged in the bearings $c'$ $d'$. The drill or other tool $g$ is secured to the rotatable shaft $d$ by any suitable chuck $g'$ or otherwise. A gage $i$ is attached to the tubular shell or case $e$, suitably graduated to determine the proper angles for the shell or case $e$ with relation to the shell or case $a$.

The hollow spherical head $b$ is employed as a shield for the double gimbal-joint, so that when the apparatus is placed in the mouth of the patient it will not inflict injury thereto.

When the shaft $c$ is rotated, it will be seen that by the construction shown the shaft $d$ will also rotate irrespective of its angular position with relation thereto.

By means of the double gimbal-joint the tool-holder may be turned to an acute angle with relation to the hand-piece, and in such position rotated freely, while the joint itself will not readily become worn.

I claim—

1. In a dental hand-piece, the case or shell $a$, containing the rotatable shaft $c$, having bearings $c'$, combined with the shell $e$ and its shaft $d$, having bearings $d'$, and the double gimbal-joint $f$, substantially as and for the purposes described.

2. In a dental hand-piece, the shell $a$ and shaft $c$, contained in it, having the bearings $c'$, the shell $e$ and shaft $d$, contained in it, bearing the tool and having bearings $d'$, and the double gimbal-joint for the shafts, combined with a shield for the double gimbal-joint, substantially as and for the purposes set forth.

In testimony whereof I have signed my name to this specification in the presence of two subscribing witnesses.

WILLIAM R. MARSH.

Witnesses:
BERNICE J. NOYES,
ANNIE S. WIEGAND.